Patented Nov. 17, 1942

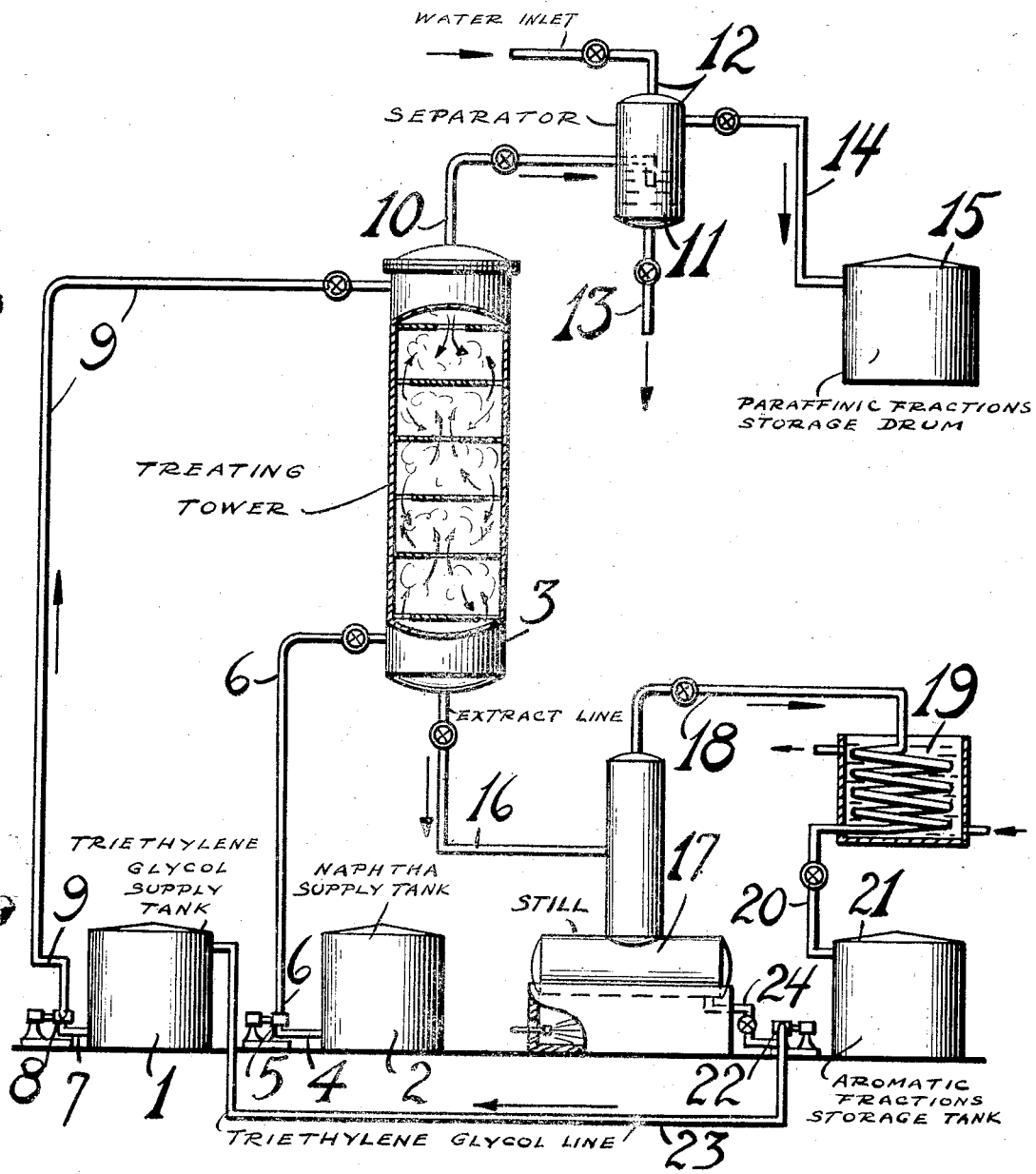

2,302,383

UNITED STATES PATENT OFFICE 2,302,383

SOLVENT EXTRACTION OF NORMALLY LIQUID HYDROCARBONS

Reginald K. Stratford, Corunna, and George W. Gurd, Sarnia, Ontario, Canada, assignors to Standard Oil Development Company, a corporation of Delaware Application December 7, 1938, Serial No. 244,322

7 Claims. (Cl. 196—13)

The present invention relates to the solvent extraction of normally liquid hydrocarbons. The invention is particularly directed to the solvent treatment of lower boiling hydrocarbons of the type of naphtha, heavy naphtha, kerosene, and light gas oil. The invention especially relates to an improved method of separating the aromatic constituents from the paraffinic constituents of said normally liquid hydrocarbons. In accordance with the process of the present invention, hydrocarbons are treated with a solvent selected from the class of dihydric alcohols characterized by having at least one ether group. The present application is a continuation-in-part of our application Ser. No. 39,880, filed September 10, 1935, entitled, "Solvent extraction of lower boiling hydrocarbons."

It is well known in the art to treat petroleum oils with various solvents in order to separate the relatively more paraffinic constituents from the more aromatic constituents. In these processes, solvents of the class which have a preferential selectivity for the more aromatic type constituents are usually employed. Solvents of this class are, for example, phenol, nitro benzene, sulfur dioxide and the like. It is also known to use other substances, as for example, liquefied normally gaseous hydrocarbons in conjunction with the above class of solvents. It is the usual practice to contact the oil and solvent in a countercurrent treating tower operation. In this operation the heavier phase, usually the solvent, is introduced at the top of a countercurrent treating tower and the lighter phase, usually the oil, is introduced at the bottom of said tower. The respective phases flow countercurrently under conditions to cause phase separation. A solvent rich or extract phase highly aromatic in nature is withdrawn from the bottom of said tower, while a solvent poor phase or raffinate phase highly paraffinic in nature is withdrawn from the top of the tower. The solvent extract phase and raffinate phase are then subjected to treatment in order to separate the solvent from the respective phases. The operation is usually conducted at atmospheric pressure, although other pressures may be employed. The temperature employed is in the range between the melting point of the solvent and the temperature at which complete miscibility occurs between the solvent and the oil. Similar results are also secured by a batch or semi-batch operation.

The processes heretofore employed, however, have not been entirely satisfactory, especially in the treatment of lower boiling hydrocarbons, since it was not possible to economically secure high yields of extracts highly aromatic in nature. For example, most naphthas contain both paraffinic and aromatic hydrocarbons. The relative quantity of each of these constituents varies with the source from which the naphtha is obtained. Thus, for example, naphthas derived from asphaltic crudes such as California, are generally rich in aromatic hydrocarbons; whereas naphthas obtained from paraffin base crudes such as Pennsylvania, are rich in paraffinic hydrocarbons. It has been found that naphthas rich in aromatic hydrocarbons are better motor fuels from the standpoint of knocking characteristics than naphthas rich in paraffinic hydrocarbons. A convenient index of the knocking characteristics of a naphtha is the octane number. The octane number is high for naphthas of low knocking tendency and low for naphthas of high knocking tendency. The knocking characteristics of naphthas to be used as motor fuels are of primary importance, so that it can be seen that it is desirable to obtain naphthas which are rich in aromatic hydrocarbons.

It is, therefore, an object of the present invention to provide a means for separating naphthas and other relatively low boiling hydrocarbon fractions into their respective paraffinic and aromatic constituents. The aromatic fractions thereby obtained may then be used either as motor fuels themselves or as blending agents for other naphthas of relatively lower octane number.

According to the present invention, low boiling hydrocarbon fractions are separated into their more paraffinic and their more aromatic fractions by means of a selective solvent. For purposes of this nature, the ideal selective solvent is one which has the following characteristics: (1) high selectivity as between paraffinic and aromatic hydrocarbons, that is to say, a solvent which has substantially no solubility for paraffinic fractions and very high solubility for aromatic fractions; (2) stability; (3) high boiling point; (4) high selectivity at temperatures approximating normal temperatures to avoid the necessity of heating or refrigeration; (5) easy separation of phases; (6) easy separation of the solvent from the extract phase, either by distillation or other means; and (7) relatively high solubility for aromatic fractions in order to avoid the use of large quantities of solvent.

We have now discovered a class of solvents which are particularly adapted for the separation of low boiling hydrocarbons into their relatively more aromatic and paraffinic fractions.

The solvents of our invention meet the above enumerated desirable characteristics, giving high yields of high quality products. The solvents of the present invention are selected from the class of dihydric alcohols which are characterized by having at least one ether group. Dihydric glycols having at least one ether group, as for example, diethylene glycol, triethylene glycol, and tetraethylene glycol, are especially desirabe.

The process of our invention may be readily understood by reference to the attached drawing illustrating one modification of the invention. For the purposes of description the solvent being treated is assumed to be triethylene glycol and the oil being treated is naphtha.

Referring to the drawing, numeral 1 designates a supply tank of triethylene glycol, numeral 2 designates a supply tank of naphtha to be treated and numeral 3 designates a treating tower which may consist of a plurality of stages and is adapted to be operated in a countercurrent manner. Naphtha is withdrawn from tank 2 through line 4 by means of pump 5 and introduced near the base of tower 3 through line 6. Triethylene glycol is withdrawn from tank 1 through line 7 by means of pump 8 and introduced into the upper portion of tower 3 through line 9. In tower 3 the naphtha and triethylene glycol flow in countercurrent relationship.

The raffinate consisting of the paraffinic fractions of the oil is withdrawn from the top of the tower through line 10. It will be found to contain only a trace of triethylene glycol which may be removed by washing the raffinate with water. For this purpose, the raffinate is introduced into separation drum 11, water is introduced through line 12, whereupon two phases are formed, the lower phase consisting of water and triethylene glycol and the upper phase consisting of the paraffinic naphtha fraction. The triethylene glycol-water phase may be removed from drum 11 through line 13 and the triethylene glycol may be recovered and recirculated to the process if desired. The paraffinic naphtha fraction is removed from drum 11 through line 14 and collected in the storage drum 15. It is to be understood that the triethylene glycol may be removed by washing the raffinate phase in a countercurrent tower rather than in drum 11.

The extract consisting of the bulk of the triethylene glycol and the aromatic fractions of the naphtha is withdrawn from tower 3 through line 16 and introduced into still 17, wherein the hydrocarbons are separated from the triethylene glycol. The hydrocarbon fractions are removed through the top of the still through line 18, condensed in cooler 19 and forwarded through line 20 to storage drum 21. Triethylene glycol which is not vaporized at the still temperatures is removed therefrom through line 21 and returned by means of pump 22 and line 23 to supply tank 1.

In the operation of the process, it will be understood that the treatment may be carried out either in a countercurrent or batch manner.

The temperature maintained in treating tower 3 will depend upon the particular petroleum oil being treated, as well as upon the solvent being used and the yield and quality of products desired. When treating naphtha with triethylene glycol, the temperature is preferably maintained between about 50° and 150° F., preferably around 100° F. It is preferred to employ atmospheric pressure, although other pressures may be employed. In the event that a light naphtha is treated it may be desirable, for example, to treat at a higher pressure in order to avoid vaporization of the light fractions of the naphtha.

The volume of solvent used per volume of oil likewise will depend upon the particular oil being treated, as well as the solvent employed. In general, it is preferred to use from about 3 to 5 volumes of solvent per volume of oil, although at times it may be desirable to use from 2 to 5 volumes of solvent per volume of oil.

The solvents of the present invention are readily recovered from the extract and raffinate phases by distillation since the solvents have relatively high boiling points. Vacuum distillation and steam stripping may also be used to recover the solvent. However, in certain instances it is desirable that the solvent be separated from the extract and raffinate phases by the addition of water or other solvent for dihydric alcohols which is immiscible with the petroleum oil. It is to be understood that a portion of the extract may be re-introduced into the counter-current treating tower.

In some cases, particularly when extracting refined naphthas, it may be desirable to add benzol, phenol, chloroform and similar substances to the diethylene and higher glycols in order to increase their solubility for the petroleum oil. It is to be understood that the selectivity and solvent power of the dihydric alcohols may be modified to any desired extent by the addition of water or similar agent thereto at one or more stages.

The extract obtained according to the present process may be used directly as a motor fuel or as a blending agent for other naphthas. It may also be subjected to other treatments such as hydrogenation, in order to increase its octane number.

It will be understood that the present process is not limited to low boiling hydrocarbons obtained from any particular source, but is of general application to all types of low boiling hydrocarbons of the type of naphthas, kerosenes, and light gas oils, whether they are obtained from natural sources or as a result of cracking, hydrogenation or synthetic processes such as polymerization, condensation, voltolization and the like. Similarly the products of the present process may be subjected to any of the usual treatments applied to naphthas for the purpose of finishing or refining.

In order to further illustrate the invention, the following examples are given which should not be construed as limiting the same in any manner whatsoever:

*Example 1*

A Conroe naphtha of the following characteristics:

| | |
|---|---|
| Refractive index at 20° C | 1.4377 |
| A. P. I. gravity | 49.3 |
| Initial boiling point °F | 218 |
| F. B. P. °F | 324 |
| 50% point °F | 244 | was treated countercurrently with 300% triethylene glycol at a temperature of 100° F. The characteristics of the extract and raffinate obtained are given in the following table:

| | Extract | Raffinate |
|---|---|---|
| Refractive index at 20° C | 1.4770 | 1.4225 |
| A. P. I. gravity | 36.7 | 54.4 |
| Yield on charge per cent | 27.5 | 72.5 |

Similar experiments carried out on the same naphtha using 600% triethylene glycol instead of 300% gave the following results:

|  | Extract | Raffinate |
|---|---|---|
| Refractive index at 20° C | 1.4750 | 1.4152 |
| A. P. I. gravity | 37.1 | 57.2 |
| Yield on charge per cent | 43 | 57 |

In the above examples the low gravity, high refractive index and the aromatic odor of the extracts indicate that the triethylene glycol has made a well defined separation of the naphtha into paraffinic and highly aromatic constituents.

*Example 2*

Various operations were conducted to determine the solubility of aromatic hydrocarbons in various glycols. These operations were conducted at a temperature of 70° F. and the results secured were as follows:

[Percent by volume of aromatic soluble in solvent (based on solvent volume)]

|  | Monoethylene glycol | Diethylene glycol | Triethylene glycol | Tetraethylene glycol |
|---|---|---|---|---|
|  | Per cent | Per cent | Per cent | Per cent |
| Benzene | 1 | 40 | 95 | (¹) |
| Toluene | (²) | 20 | 30 | 90 |
| Xylene | (²) | 10 | 20 | 35 |

¹ Mutually soluble in all proportions.
² Less than 1%.

From the above data it is readily apparent that monoethylene glycol is not at all suitable as a selective solvent for aromatic type materials and that tri- and particularly tetraethylene glycol are far superior.

*Example 3*

Various operations were conducted to determine the solubility of aromatic materials in ethylene glycol, diethylene glycol and triethylene glycol at various temperatures. The results of these operations were as follows:

| Temperature, °F | Benzene dissolved in — | | |
|---|---|---|---|
|  | Ethylene | Diethylene | Triethylene |
|  | Per cent | Per cent | Per cent |
| 240 | 5 |  |  |
| 205 |  | 100 |  |
| 110 |  |  | 100 |

*Example 4*

The following data summarize the results secured when treating a feed stock, comprising one volume of benzene, two volumes of toluene, and two volumes of xylene present in an aromatic-free Mid-Continent naphtha to make a total aromatic concentration of 57%, with 43% by volume of tetraethylene glycol:

|  | Original | Extract | Raffinate |
|---|---|---|---|
| Gravity °A. P. I | 43.5 |  | 44.5 |
| Refractive index | 1.4555 | 1.4868 | 1.4520 |
| Aromatics per cent | 57 | 91 | 53 |
| Yield do |  | 10 | 90 |

It will be observed that a single batch treat produced a 10% yield of extract containing 91% pure aromatics. Additional operations disclosed the fact that the solubility of aromatics in tetraethylene glycol increased rapidly with increasing temperature. Thus, this solvent may readily be employed in an operation in which the extraction stage is conducted at a relatively high temperature, followed by separation of a relatively poor aromatic fraction from the extract phase simply by cooling.

This invention is not to be limited by any theories of the mechanism of the reactions, nor by any details which have been given merely for purposes of illustration, but is limited only in and by the following claims in which it is our intention to claim all novelty inherent in the invention.

We claim:

1. Process for separating a hydrocarbon fraction of the class of naphtha, kerosene, and light gas oil into its relatively more paraffinic and relatively more aromatic constituents, which comprises extracting the hydrocarbon fraction with a solvent consisting essentially of a substance selected from the class of dihydric alcohols characterized by having at least two ether groups.

2. Process for separating a hydrocarbon fraction of the class of naphtha, kerosene, and light gas oil into its relatively more paraffinic and relatively more aromatic constituents, which comprises extracting the hydrocarbon fraction with a solvent consisting essentially of a substance selected from the class of dihydric glycols characterized by having at least two ether groups.

3. Process for separating a hydrocarbon fraction of the class of naphtha, kerosene, and light gas oil into its relatively more paraffinic and relatively more aromatic constituents, which comprises extracting the hydrocarbon fraction with triethylene glycol.

4. Improved process for separating a hydrocarbon fraction of the class of naphtha, kerosene and light gas oil into relatively more paraffinic and more aromatic constituents which comprises countercurrently contacting said hydrocarbon fraction in liquid phase with a solvent consisting essentially of a substance selected from the class of dihydric alcohols which are characterized by having at least two ether groups under conditions to form a raffinate phase and a solvent extract phase, separating the respective phases and removing the solvent therefrom.

5. Process in accordance with claim 4 in which said solvent is triethylene glycol.

6. Process in accordance with claim 4 in which the solvent is removed from the respective phases by washing with water at ordinary temperature.

7. Process for separating a normally liquid hydrocarbon into its relatively more paraffinic and relatively more aromatic constituents which comprises extracting the hydrocarbon fraction in liquid phase with a solvent mixture comprising a substance selected from the class consisting of benzol and phenol and containing at least 50% of a substance selected from the class of dihydric alcohols characterized by having at least two ether groups.

REGINALD K. STRATFORD.
GEORGE W. GURD.